United States Patent
Fischer et al.

[15] 3,685,845
[45] Aug. 22, 1972

[54] CHUCKING DEVICE FOR MACHINE TOOLS

[72] Inventors: David Fischer, Mainaschaff; Rudolf Kohler, Stockstadt; Hugo Roos; Joachim Merker, both of Rottenburg, all of Germany

[73] Assignee: Huller Rottenburg Gesellschaft mit beschrankter Haftung, Rottenburg, Germany

[22] Filed: May 11, 1970

[21] Appl. No.: 35,971

[30] Foreign Application Priority Data

May 13, 1969 Germany..........P 19 24 321.1

[52] U.S. Cl............................................279/5, 279/6
[51] Int. Cl. .............................................B23b 31/36
[58] Field of Search................279/1 H, 1 J, 1 L, 5, 6

[56] References Cited

UNITED STATES PATENTS

| | | | |
|---|---|---|---|
| 2,423,312 | 7/1947 | Hamberger | 279/6 |
| 2,456,776 | 12/1948 | Faust | 279/6 |
| 3,357,711 | 12/1967 | Fischer | 279/6 |

FOREIGN PATENTS OR APPLICATIONS 345,220  4/1960  Switzerland..................279/6

*Primary Examiner*—Andrew R. Juhasz
*Assistant Examiner*—James F. Coan
*Attorney*—Walter Becker

[57] ABSTRACT

A chucking device in which a body part is supported for rotation on an axis and has an inner support member rotatable in the body part on an axis parallel to and spaced radially from the axis of the body part. A chuck is rotatably mounted in the inner support member on an axis parallel to and radially spaced from the axis of the support member. The support member can be clamped to the body part in rotated positions thereof while the chuck is indexable in the support member and can be arrested in indexed positions thereof.

22 Claims, 5 Drawing Figures

PATENTED AUG 22 1972    3,685,845

Inventors:
David Fischer
Rudolf Kohlert
Hugo Boos
Joachim Merker
By Walter Becker

CHUCKING DEVICE FOR MACHINE TOOLS

The present invention relates to a device for chucking work pieces to machine tools. When producing bores in a work piece, it is necessary that the work piece rotates about the boring or drilling axis during the production of the bore. Therefore, for a machining operation of this type, the work piece is chucked into a chucking device of the machine tool and is so aligned that the bore to be produced is in axial alignment with the spindle of the machine tool and with the borer or drill.

If a plurality of bores are to be provided in the work piece, which bores are equally spaced from the central axis of the work piece, in other words, are located on the same so-called pitch circle, the work piece is fastened to a chuck or clamping device which is equipped for rotatably journalling the work piece and is located eccentrically with regard to the spindle axis. After one of the bores of the work piece has been aligned with the spindle axis, all other bores of the same pitch circle can by a simple rotation of the holding means and thereby of the work piece be brought into alignment with the spindle axis. Chucks or clamping devices meeting this requirement are known. These known clamping devices, however, are usable only for work pieces the bores of which are located on a certain pitch circle. When bores have to be provided on the work piece which are located on another pitch circle, it is necessary to transfer the work piece to another clamping device and to align the same anew. With bores located on different pitch circles, it is therefore necessary repeatedly to transfer the work piece from one clamping device to another one with a corresponding aligning operation for the work piece. Such procedure requires considerable time and labor and, therefore, is expensive. The manufacture of a clamping device for each pitch circle is economically feasible only in connection with the mass production of one and the same piece.

It is, therefore, an object of the present invention to provide clamping means for machining work pieces which will overcome the above mentioned drawbacks.

It is another object of this invention to provide clamping means for receiving work pieces to be machined which will make it possible to provide a work piece with bores located on different pitch circles without the necessity of transferring the work piece from one clamping device to another clamping device.

These and other objects and advantages of the invention will appear more clearly from the following specification in connection with the accompanying drawings, in which.

Figure 1:
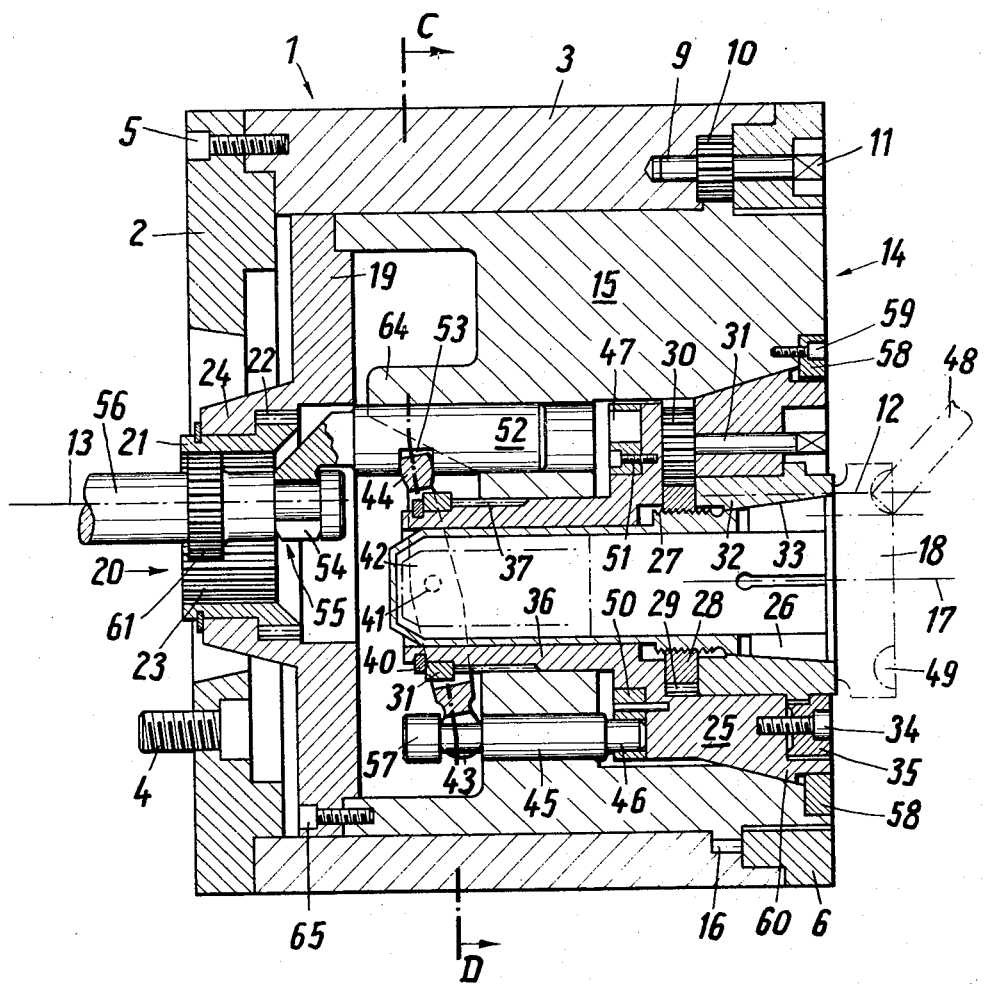
FIG. 1 illustrates a longitudinal section through a device according to the invention, said section being taken along the line E—F of FIG. 3.

The clamping device according to the present invention is characterized primarily by a hollow housing of cylindrical shape which is adapted to be connected to the spindle of the machine tool and the axis of rotation of which coincides with the spindle axis of the machine tool while an eccentric round opening is provided in the housing into which opening there is inserted an inner member adapted to be adjusted by rotation about its axis, said inner member being provided with a likewise eccentrically located bore for receiving a member which is rotatable about its axis and into which the clamping means for the work piece is inserted. The spacing between the axis of rotation of the housing and the axis of said inner member is less than or equals the distance between the axis of the inner member and the axis of the member received in said bore which may be termed cycle member.

Such a device permits a clamping or chucking of the work piece and the alignment of the area to be machined with the axis of rotation of the housing and thereby with the spindle axis without the necessity of transferring the work piece from one clamping device to another. A rotation of the cycle member itself or together with the inner member will suffice for the alignment of the work piece. When bores are involved which are located on the same pitch circle, only the cycle member is rotated whereas when bore are involved which are located on different pitch circles, it is necessary additionally to turn the inner member. In view of the eccentric location of the inner member with regard to the spindle of the machine tool and the likewise eccentric location of the cycle member, it will be appreciated that during the turning of the inner member, the work piece inserted in the cycle member is adjusted radially with regard to the axis of rotation of the housing without the possibility of creating any material unbalance.

For turning and adjusting the inner member to a predetermined position, the inner member is provided with a gear ring which meshes with a gear or worm wheel drive provided in the housing. The inner member can be arrested in its respective adjusted position. For arresting the inner member, the gear ring of the latter is clamped fast to the housing by clamping screws. The clamping screws may be arranged in a holding ring on the housing. A certain pitch circle corresponds to each position of the inner member so that after an adjustment of the inner member, any desired point of the pitch circle defined by the adjustment can be brought into the position necessary for the respective machining operation. To this end, it is merely necessary to turn the cycle member and to arrest the same in the desired position.

According to a preferred embodiment of the invention, the cycle member is provided with a conical bearing surface which engages a conical counter surface of the inner member. This brings about a very precise centering of the cycle member. For purposes of turning the cycle member, the conical surfaces of the cycle member and of the inner member are spaced from each other in order to eliminate the occurring frictional forces.

The turning of the cycle member about its axis may be effected by means of a gear transmission which is coupled to an adjusting shaft passed through the spindle of the machine tool. The gear transmission comprises a gear ring which is connected to the adjusting shaft and furthermore comprises a hollow gear provided with inner and outer teeth and centrally located in the inner member. The gear transmission furthermore comprises a shaft which is eccentrically located in the inner member and has its ends respectively provided with gear wheels. The gear transmission also comprises teeth on the cycle member while the gear ring meshes with the inner teeth of the hollow gear. The outer teeth of the hollow wheel drive a gear which is mounted on one end of the shaft while the gear mounted on the other end of the shaft meshes with the teeth on the cycle member. The bearing surface for the journalling of the hollow gear in the inner member is provided adjacent the outer teeth of the hollow gear.

In many instances, the same work piece is subjected to the same working cycle at areas angularly spaced from each other. In such an instance, it is advantageous that the work piece arrests itself automatically in the predetermined position. To this end, the cycle member may be provided with abutment surfaces, preferably arresting bores, which permit a stepwise turning and arresting of the cycle member.

The arresting of the cycle member may be effected by a bolt which is displaceably mounted in the inner member for a displacement in axial direction. The bolt is adapted to have its protruding end inserted into certain bores of the cycle member. The bolt is by means of a linkage connected to the adjusting shaft of the machine tool and is adapted to be actuated in longitudinal direction by a displacement of the adjusting shaft. The linkage has a two-arm lever which is pivotally journalled in the central portion thereof. This lever has one end in engagement with a bolt while its other end engages a displaceable pin which is displaceable in axial direction in the inner member and is rotatable about its axis. The angled off and forked free end of said pin is adapted to engage an annular groove in the adjusting shaft.

The two-arm lever may be designed in the form of a ring which for purposes of engaging the bolt and the displaceable pin is provided with two oppositely located outwardly pointing pivots or studs. It is favorable to mount the ring on the cycle member without thereby affecting the rotatability of the cycle member. To this end, the pivot axis of the ring is formed by two pins connected to the ring which pins are held in a slidable sleeve which is rotatably mounted on the cycle member.

The clamping means for the work piece which is inserted into the cycle member may consist of a clamping sleeve provided with a thread. The clamping sleeve is adapted through a nut located in the cycle member and having its circumference provided with teeth to be moved in its longitudinal direction by means of a pinion for chucking or unchucking an inserted work piece.

Figure 2:
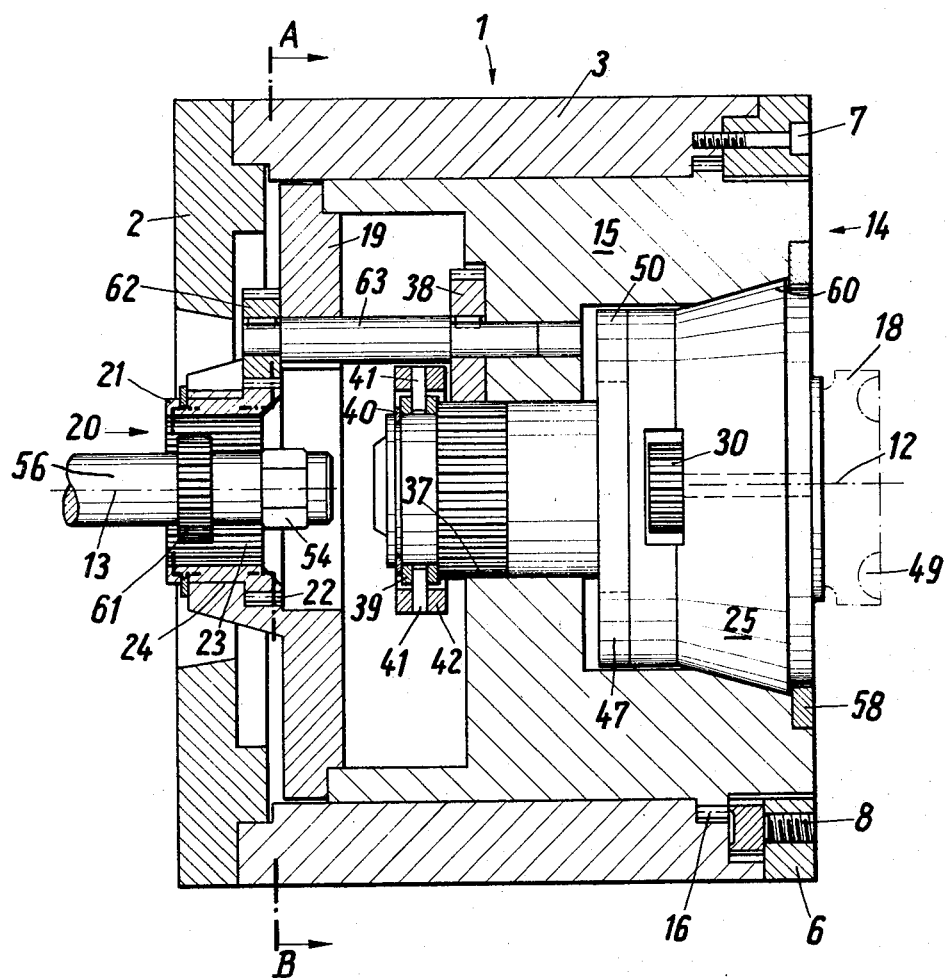
FIG. 2 represents a longitudinal section through the device according to the invention, said section being taken along the line G—H of FIGS. 3 and 5.

Referring now to the drawings in detail, it will be seen from FIGS. 1 and 2 that the clamping device comprises a housing 1 which includes a base plate 2 and a cylindrical hollow mounting member 3. Housing 1 is connected to the spindle of a non-illustrated machine tool by screws 4. The screws 4 are inserted into the base plate 2 of the housing. The mounting member 3 is connected to the base plate 2 by means of screws 5. A holding ring 6 is by means of a plurality of screws 7 distributed over its surface connected to the mounting member 3. Inserted into the holding ring 6 are furthermore a plurality of clamping screws 8 the function of which will be explained further below. Furthermore, through the upper portion of the holding ring 6 there is passed the shaft 9 of a pinion 10 the end 11 of which is of a polygonal shape.

The axis of rotation 12 of housing 1 coincides with the spindle axis 13 of the machine tool. The mounting member 3 has a round opening 14 which is eccentrically located with regard to the axis of rotation 12. It is into this opening 14 of the mounting member 3 that the inner member 15 is inserted which has a gear ring 16. The inner member 15 may be rotated in the mounting member 3 as long as the clamping screws 8 in the holding ring 6 are loose. The rotary movement is brought about by a pinion 10 which is mounted on shaft 9 and which meshes with the gear ring 16 of the inner member 15.

The shaft 9 of the pinion 10 has its outer end 11 of polygonal shape so that by means of a simple polygonal key the pinion 10 and thereby through the intervention of the gear ring 16, the inner member 15 can be manually rotated. The rotary movement of the inner member 15 serves for adjusting the desired pitch circle which means the distance between the axis of rotation 12 of housing 1 and of the axis 17 of the work piece 18 to be machined which is indicated by dash lines. If by turning the inner member 15 the desired adjustment of the work piece 18 has been obtained, the inner member 15 is arrested by tightening the clamping screw 8 of the holding ring 6.

The inner member 15 has a bottom 19 with an opening 20 which is centrally arranged with regard to the inner member 15. A hollow gear 21 is rotatably inserted into said opening 20. The gear 21 has an outer gear ring 22 and an inner gear ring 23. The bearing surface 24 for journalling the hollow gear 21 in the inner member 15 is provided adjacent the outer gear ring 22. The cycle member 25 is rotatably inserted into the bore of the inner member 15 which bore is conical at its mouth. The member 25 has its outwardly pointing end likewise conically designed so that when a tightening is effected in axial direction in the bore, the cycle member 25 will always assume a predetermined centered position. The clamping sleeve 26 is inserted into the cycle member 25 and through a section starting after the conically designed and slotted clamping part is provided with a thread 27. By means of this thread 27 and an inwardly located nut 28 with gear 29 it is possible to tighten the clamping sleeve 26. To this end, there is employed a pinion 30 with shaft 31. The nut 28 is held in its respective position by means of a busing 32. This bushing 32 simultaneously forms a counter bearing for the sleeve 26 and therefore has its interior provided with a conical surface 33. The bushing 32 in its turn is held by claws 35 which by means of screws 34 are connected to the cycle member 25.

The cycle member 25 is provided with a pivot 36 which is journalled in an eccentrically located bore of the inner member 15. The pivot 36 is equipped with a gear ring 37 meshing with the gear 38 (FIG. 2). One end of the pivot 36 has rotatably mounted thereon a sliding sleeve 39 which is held by means of a snap ring 40. Inserted into the sliding sleeve 39 are two oppositely located pins 41 which have their protruding ends provided with a ring 42. The ring 42 is adapted to be pivoted about the pins 41. Offset by 90° with regard to the pivot axis of ring 42 are two outwardly pointing prongs 43 and 44 provided on the ring 42.

The prong 43 is fork-shaped and engages an annular groove on the bolt 45 which is axially displaceably held in a bore of the inner member 15. Bolt 45 has a protruding or projecting end 46 by means of which it is adapted to be inserted into corresponding bores 47 of the cycle member 25. In this way the cycle member 25 can be arrested in a predetermined position. This position corresponds to a certain position of the work piece 18 to be machined. If, for instance, with the work piece 18 to be machined it is intended to mill along a pitch circle a plurality of calottes 49 by means of the miller 48, which calottes are spaced from each other by given angular distances, the cycle member 25 is provided with a number of bores 47 for the bolt 45 which number of bores corresponds to the number of calottes. In order to avoid that when changing the angular distances on the work piece 18, it will be necessary to exchange the cycle member 25, bores 47 are provided in a mounting plate 50 which by means of screws 51 is exchangeably connected to the cycle member 25.

Opposite to the bolt 45 there is provided in the inner member 15 a sliding pin 52 which in its turn has a recess 43 into which the prong 44 is inserted. Thus, when ring 42 is pivoted about the oppositely located pins 41, the bolt 45 and the pin 52 are moved in opposite directions.

The pin 52 has its end 54 angled off and designed in the manner of a fork. This end 54 engages an annular groove 55 on the adjusting shaft 56 of the machine tool. The adjusting shaft 56 is passed through a bore located in the central portion of the machine tool spindle. A displacement of the adjusting shaft 56 in its longitudinal direction merely brings about that the sliding pin 52 is displaced in its bore in the inner member 15 and the ring 42 is pivoted about the pins 41. As a result thereof, the bolt 45 is likewise displaced, and the cycle member 25 is, depending on whether the bolt end 46 is pulled out of a bore 47 or is pushed into a bore 47, released or latched.

In order to permit an easy rotary movement of the cycle member 25 without the occurrence of too high frictional forces, which may occur at the adjacent conical surfaces of the cycle member 25 and the inner member 15 for carrying out the rotary operation, the conical surfaces are spaced from each other. This is brought about by the fact that prior to the completion of the outwardly directed longitudinal movement of pin 52, the bolt end 57 engages the bottom 19 of the inner member 15 so that a counter pressure builds up and during the further movement of the pin 52 the ring 42 will pivot about the prong 43 and the cycle member 25 will by means of the pins 41 be pressed outwardly. An abutment ring 28 which by means of screws 59 is connected to the inner member 15 serves for limiting the movement of the cycle member 25 toward the outside. A projection 60 of the cycle member 25 will engage the ring 58.

For purposes of tightening and locking the cycle member 25, the movement is effected in opposite direction. The adjusting shaft 56 and thus the pin 52 are pulled inwardly, the ring 42 pivots about the pins 41, and the bolt 45 is pressed outwardly into the corresponding bore 47. As soon as the fork-shaped prong 43 engages the inner member 15, the cycle member 25 is pulled inwardly and is arrested with its conical surfaces.

The rotary movement of the cycle member 25 is realized likewise through the intervention of the adjusting shaft 56 which to this end is provided with a gear ring 61. By means of this gear ring 61, the gear 21 is driven which is journalled in the inner member 15. The gear 21 has its inner side provided with extended teeth 23 so that the gear ring 61 of the adjusting shaft 56 will during the above mentioned longitudinal movements of the adjusting shaft 56 always stay in mesh with the gear 21.

With the outer teeth 22, the gear 62 is driven by the gear wheel 21, said gear 62 being mounted on one end of shaft 63 (FIG. 2). A further gear 38 is mounted on shaft 63 and meshes with teeth 57 provided on the pivot 36 of the cycle member 25.

Thus, when the adjusting shaft 56 is turned, the cycle member 25 is rotated through the intervention of gears 21, 62 and 38. By means of simple adjusting devices mounted on the adjusting shaft 56, it is possible to adapt the rotary movements of the adjusting shaft 56 in conformity with the angular spacing between one bore 47 and the next bore 47 and thus between one machining area 49 and the next machining area 49 of the work piece 19 so that the cycle member 25 will automatically cyclicly adjust itself.

Figure 3:
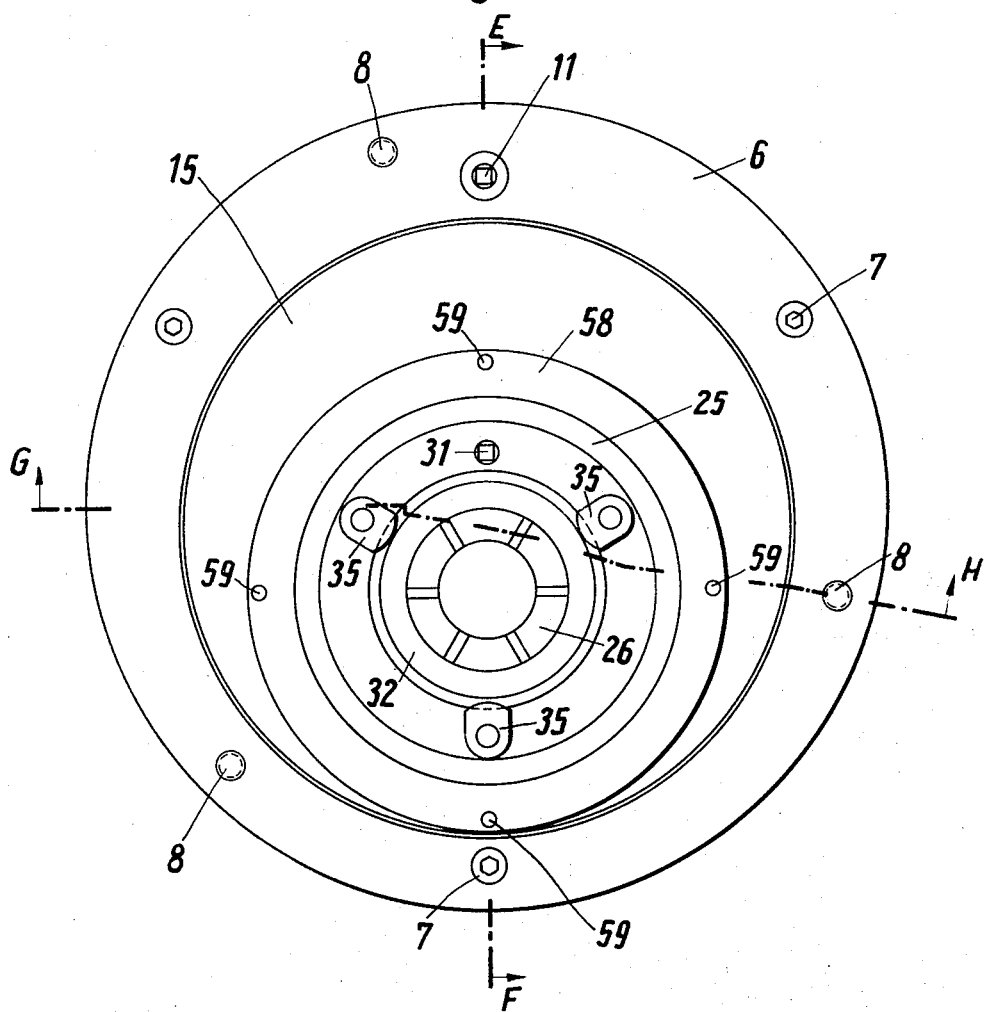
FIG. 3 is a front view of the device according to the invention.

FIG. 3 shows a front view of the device according to the invention. From this view, the eccentricity of the opening 14 for the inner member 15 and of the bore for the cycle member 25 will be evident. The connecting screw 7 for the holding ring 6 and the clamping screws 8 in the holding ring 6 are spaced from each other by equal angular distances. In the upper portion of the holding ring 6 there is located the end 11 of shaft 9 of pinion 10 for the turning of the inner member 15. The abutment ring 58 is connected to the inner member 15 by screws 59. Three claws 35 are screwed to the cycle member 25 and hold the bushing 32. Shaft 31 for the pinion for tightening the clamping sleeve 26 is arranged in the cycle member 25.

Figure 4:
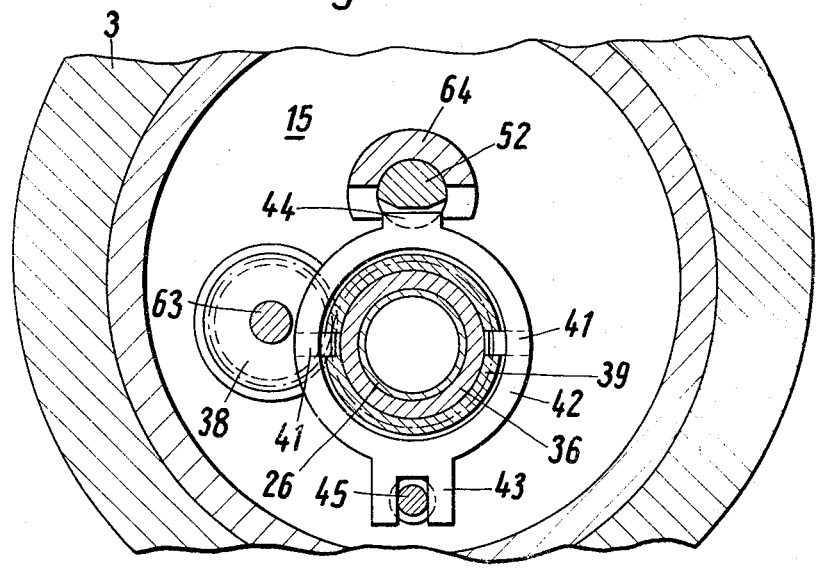
FIG. 4 represents a cross-section through the device according to the invention, said section being taken along the line C—D of FIG. 1.

FIG. 4 shows a section taken along the line C—D of FIG. 1 and, more specifically, illustrates the design of the ring 42. The pins 41 engage the sliding sleeve 39 on the pivot or stud 36. The member 36 can be rotated without ring 42 changing its position. The prong 43 of ring 42 is fork-shaped and engages the annular groove on bolt 42, whereas the oppositely located prong 44 of ring 42 is inserted into the recess 53 on pin 52. A bearing member 64 projecting from the inner member 15 will in addition to the bore in the inner member 15 further support and guide the pin 52. The gear 38 is inserted into a depression of the inner member 15. Shaft 63 is journalled in the inner member 15.

Figure 5:
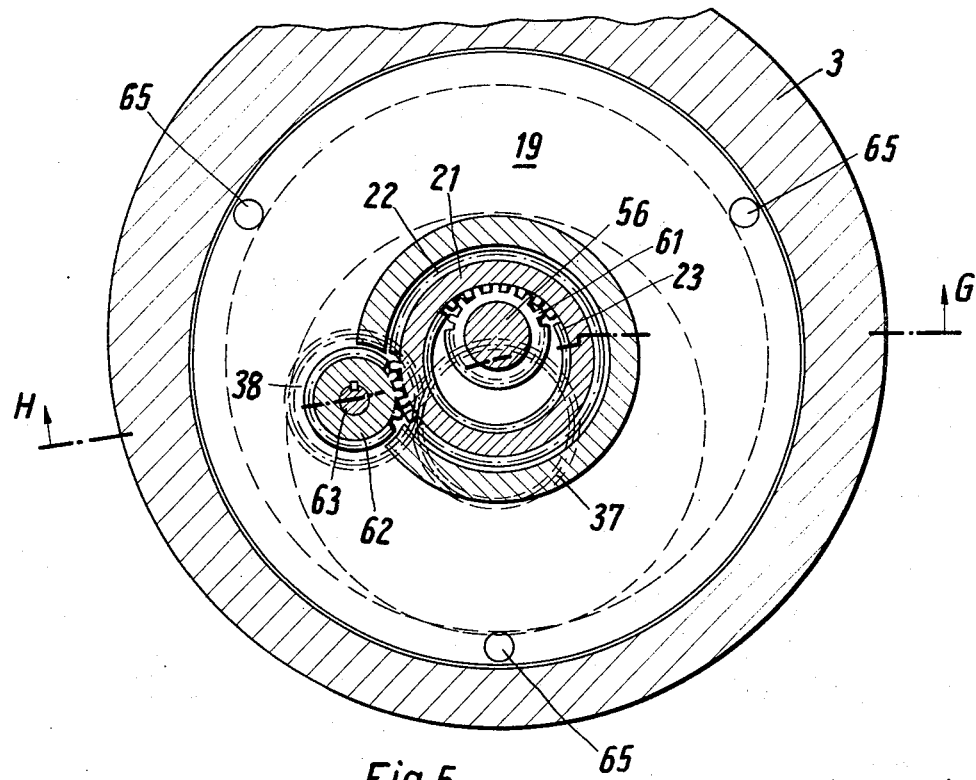
FIG. 5 represents a cross-section through the device according to the invention, said section being taken along the line A—B of FIG. 2.

In FIG. 5, which represents a section taken along the line A—B of FIG. 2, there is shown the arrangement of all gears 21, 62 and 38 as well as the gear rings 61 and 37 with regard to each other. The gear ring 61 of the adjusting shaft 56 is adapted through the intervention of the inner teeth 23 to drive the gear 21 which is journalled in the inner member 15 and by means of its outer teeth 22 drives the gear 62 mounted on one end of shaft 63. The gear 38 mounted on the other end of shaft 63 has its teeth in mesh with the teeth 37 provided on the stud 36 of the cycle member 25. The bottom 19 is connected to the inner member 15 by means of three screws 65.

The device according to the present invention makes possible a displacement of the center of the work piece radially with regard to the axis of the end of the machine tool while avoiding the possibility of the occurrence of a noticeable unbalance of the clamping device. The adjustment of the work piece can be effected in an infinitely variable manner so that any desired pitch circle can be realized. Furthermore, all movable parts of the clamping device always remain in engagement with each other during the adjusting operation.

The device according to the invention permits the chucking and aligning of work pieces which are to be machined at their end faces while the individual areas to be machined may have different radii with regard to the center of the work piece. Moreover, bores can be produced, calottes can be milled or other similar working operations can be carried out without the necessity of transferring the work piece from one clamping device to another clamping device. The area to be machined can by a few manual operations always be brought to the center of the device and can be arrested in the respective position.

It is advantageous to provide the adjusting shaft with an automatic cycling device. Such device makes possible an automatic cycling or cycle advance of the cycle member by predetermined angular distances so that the areas of the work piece to be machined can automatically be brought to the rotation center of the clamping or chucking device.

It is, of course, to be understood that the present invention is, by no means, limited to the particular structure shown in the drawings but also comprises any modifications within the scope of the appended claims.

What is claimed is:

1. In a chucking device for accurately clamping a workpiece: a hollow cylindrical housing adapted for connection to a spindle for rotation on the spindle axis, a support member eccentrically supported by said housing for rotation thereon on a second axis parallel to and spaced radially offset from said spindle axis, workpiece engaging means also eccentrically supported by said already eccentrically supported support member on a third axis parallel to and spaced radially from said second axis, and means rotatable about axis thereof for adjusting said support member and workpiece engaging means about said second and third axes, respectively thereby to enable work upon several points of the workpiece that remains located upon one adjustable graduated range of a circle in alignment with respect to the spindle axis and indexed automatically in maintained clamped condition in identical angular space intervals.

2. A chucking device according to claim 1, in which said housing has an eccentric bore therein in which said support member is rotatably mounted, and said support member also has an eccentric bore therein in which said workpiece engaging means is rotatably mounted in automatically indexable chucking adjustment.

3. A chucking device according to claim 2, in which the radial distance from said spindle axis to said second axis is not greater than the radial distance from said second axis to said third axis.

4. In a chucking device for a workpiece: a housing adapted for connection to a spindle for rotation on the spindle axis, a support member eccentrically supported by said housing for rotation thereon on a second axis parallel to and spaced radially from said spindle axis, workpiece engaging means eccentrically supported by said support member on a third axis parallel to and spaced radially from said second axis, and means for adjusting said support member and workpiece engaging means about said second and third axes, respectively, said housing having an eccentric bore therein in which said support member is rotatably mounted, and said support member also having an eccentric bore therein in which said workpiece engaging means is rotatably mounted, said workpiece engaging means being exposed at one end of said housing to receive a workpiece, a central axial bore in the other end of said housing, an axial bore in said support member at the end thereof adjacent said other end of said housing, a control member extending through said bores, and means connecting said control member to said workpiece engaging means for rotation of the workpiece engaging means by rotation of said control member.

5. A chucking device according to claim 2, in which said means for adjusting said support member about said second axis comprises peripheral gear means formed thereon, and pinion means rotatable in said housing and meshing with said peripheral gear means.

6. A chucking device according to claim 2, which includes arresting means for arresting said support member in said housing in adjusted positions about said second axis.

7. A chucking device according to claim 6, in which said arresting means includes clamp screws in the housing adjustable into clamping engagement with said support member.

8. A chucking device according to claim 7, which includes a retaining ring on said housing retaining said support member therein, said clamp screws being carried by said retaining ring.

9. In a chucking device for a workpiece: a housing adapted for connection to a spindle for rotation on the spindle axis, a support member eccentrically supported by said housing for rotation thereon on a second axis parallel to and spaced radially from said spindle axis, workpiece engaging means eccentrically supported by said support member on a third axis parallel to and spaced radially from said second axis, and means for adjusting said support member and workpiece engaging means about said second and third axes, respectively, said housing having an eccentric bore therein in which said support member is rotatably mounted, and said support member also having an eccentric bore therein in which said workpiece engaging means is rotatably mounted, said workpiece engaging means comprising an inner chuck element for receiving a workpiece and an outer support element supporting the chuck element and mounted in the eccentric bore in said support member, the said eccentric bore in said support member tapering outwardly toward the workpiece side of said housing and said support element being formed with a complementary external taper, and means for moving said support element axially in said support member to cause the tapered surfaces of said eccentric bore in the support member and on said support element to engage and disengage.

10. A chucking device according to claim 4, in which said control member is in the form of a rotatable adjusting shaft, a pinion on said adjusting shaft, gear teeth on said support element, and gearing connecting said pinion with said gear teeth.

11. A chucking device according to claim 10, in which said gearing comprises a sleeve rotatable on said member and having internal teeth meshing with the pinion on said adjusting shaft, external teeth on said sleeve, a counter shaft rotatable in said support member, and gears on said counter shaft meshing with the external teeth on said sleeve and with the gear teeth on said support element respectively.

12. A chucking device according to claim 11, in which said sleeve has a cylindrical outer surface portion journaled in said support member.

13. A chucking device according to claim 10, in which said adjusting shaft is mounted on the axis of rotation of said housing and spindle, the relative diameters of the pinion on said adjusting shaft and the gear formed by the internal teeth on said sleeve being such that the pinion and gear remain in mesh in all rotated positions of said support member in said housing.

14. A chucking device according to claim 10, which includes means carried by said support member engageable with said support element to arrest the support element in predetermined positions of angular adjustment in said support member.

15. A chucking device according to claim 14, in which said means for arresting said support element comprises a bolt reciprocable in said support member and circumferentially distributed bore means in said support element engageable by said bolt.

16. A chucking device according to claim 15, in which said adjusting shaft is reciprocable and which includes linkage means connecting said bolt with said adjusting shaft for reciprocation of said bolt into and out of engagement with said support element in response to reciprocation of said adjusting shaft.

17. A chucking device according to claim 16, in which said linkage means comprises a lever pivoted intermediate the ends thereof to said support element and having one end engaging said bolt, a displacement pin reciprocable in said support member and engaging the other end of said lever, and a forked end part on said pin engaging a grooved region on said adjusting shaft.

18. A chucking device according to claim 17, in which said lever is in the form of a ring having oppositely located radial extensions thereon engaging said bolt and pin, respectively.

19. A chucking device according to claim 17, in which said ring is rotatable relative to said support element.

20. A chucking device according to claim 17, which includes a support collar rotatable on said support element and to which collar said ring is pivoted on an axis which intersects said third axis at a right angle.

21. A chucking device according to claim 9, in which said inner chuck element is axially movable in said support element for clamping and releasing a workpiece, threads on said chuck element, and a nut in said support element engaging said threads and rotatable for effecting axial movement of said chuck element in said support element.

22. A shucking device according to claim 20, in which said support member includes abutment means limiting axial movement of said bolt in both directions whereby reciprocation of said adjusting shaft will cause axial movement of said support element in said support member when said bolt reaches the limit positions thereof.

* * * * *